(12) United States Patent
Durham et al.

(10) Patent No.: US 8,671,439 B2
(45) Date of Patent: *Mar. 11, 2014

(54) TECHNIQUES FOR AUTHENTICATED POSTURE REPORTING AND ASSOCIATED ENFORCEMENT OF NETWORK ACCESS

(75) Inventors: David Durham, Beaverton, OR (US); Ravi Sahita, Beaverton, OR (US); Karanvir Grewal, Hillsboro, OR (US); Ned Smith, Beaverton, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1083 days.

This patent is subject to a terminal disclaimer.

(21) Appl. No.: 12/460,736

(22) Filed: Jul. 23, 2009

(65) Prior Publication Data
US 2010/0071032 A1 Mar. 18, 2010

Related U.S. Application Data

(63) Continuation of application No. 11/174,205, filed on Jun. 30, 2005, now Pat. No. 7,739,724.

(51) Int. Cl.
*G06F 21/00* (2013.01)
(52) U.S. Cl.
USPC .................................. 726/3; 726/29; 713/193
(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,185,047 B1 * | 2/2007 | Bate et al. | 709/202 |
| 7,185,847 B1 | 3/2007 | Bouchard et al. | |
| 7,272,719 B2 | 9/2007 | Bleckmann et al. | |
| 7,290,288 B2 * | 10/2007 | Gregg et al. | 726/28 |
| 7,409,704 B1 | 8/2008 | Charas | |
| 7,506,155 B1 | 3/2009 | Stewart et al. | |
| 7,739,724 B2 * | 6/2010 | Durham et al. | 726/3 |
| 2003/0115341 A1 | 6/2003 | Sinha et al. | |

(Continued)

FOREIGN PATENT DOCUMENTS

| | | |
|---|---|---|
| EP | 1601153 B1 | 7/2010 |
| WO | 2013112816 A1 | 8/2013 |

OTHER PUBLICATIONS

"Draft Standard for Local and Metropolitan Area Networks—Media Access Control (MAC) Security", IEEE P802.1AE/D5.1, LAN/MAN Standards Committee, IEEE Computer Society, Jan. 19, 2006, pp. 1-150.

(Continued)

*Primary Examiner* — Kaveh Abrishamkar
(74) *Attorney, Agent, or Firm* — Barnes & Thornburg, LLP (57) ABSTRACT

Architectures and techniques that allow a firmware agent to operate as a tamper-resistant agent on a host platform that may be used as a trusted policy enforcement point (PEP) on the host platform to enforce policies even when the host operating system is compromised. The PEP may be used to open access control and/or remediation channels on the host platform. The firmware agent may also act as a local policy decision point (PDP) on the host platform in accordance with an authorized enterprise PDP entity by providing policies if a host trust agent is non-responsive and may function as a passive agent when the host trust agent is functional.

28 Claims, 4 Drawing Sheets

(56) References Cited

U.S. PATENT DOCUMENTS

| | | |
|---|---|---|
| 2003/0229808 A1 | 12/2003 | Heintz et al. |
| 2005/0132122 A1 | 6/2005 | Rozas |
| 2005/0138417 A1* | 6/2005 | McNerney et al. ............ 713/201 |
| 2006/0041938 A1 | 2/2006 | Ali |
| 2006/0206932 A1 | 9/2006 | Chong |
| 2007/0006282 A1 | 1/2007 | Durham et al. |
| 2007/0101159 A1 | 5/2007 | Zhang et al. |
| 2008/0294586 A1 | 11/2008 | Lim |
| 2009/0007217 A1 | 1/2009 | Birger et al. |
| 2009/0019537 A1 | 1/2009 | Stavrou et al. |
| 2009/0034743 A1 | 2/2009 | De Petris et al. |
| 2009/0234954 A1 | 9/2009 | Sheehan |
| 2010/0100953 A1 | 4/2010 | Mowers et al. |
| 2010/0107224 A1 | 4/2010 | Durham et al. |
| 2010/0293385 A1 | 11/2010 | Nanda et al. |
| 2011/0154031 A1 | 6/2011 | Banerjee et al. |
| 2012/0084561 A1 | 4/2012 | Soulios |
| 2013/0024688 A1 | 1/2013 | Wen et al. |
| 2013/0198509 A1 | 8/2013 | Buruganahalli et al. |

OTHER PUBLICATIONS

"IEEE Standard for Local and Metropolitan Area Networks—Port-Based Network Access Control", IEEE Std 802.1X (TM)—2004, LAN/MAN Standards Committee, IEEE Computer Society, Dec. 13, 2004, pp. i-vii & 1-169.

"Draft Standard for Local and Metropolitan Area Networks—Port-Based Network Access Control—Amendment 1: Authenticated Key Agreement for Media Access Control (MAC) Security", IEEE P802.1af/D0.4, LAN/MAN Standards Committee, IEEE Computer Society, Jan. 16, 2006, pp. 1-219.

"IEEE Standard for Information Technology-Telecommunications and Information Exchange Between Systems—Local and Metropolitan Area Networks-Specific Requirements Part 11: Wireless LAN Medium Access Control (MAC) and Physical Layer (PHY) Specifications—Amendment 6: Medium Access Control (MAC) Security Enhancements",IEEE Computer Society, IEEE Std 802.11i (TM)-2004, LAN/MAN Standards Committee, IEEE Computer Society, Jul. 23, 2004., pp. i-iv & 1-175.

McAfee Inc., "McAfee® Network Security Platform," M-8000 Sensor Product Guide, 2011, 38 pages.

McAfee, Inc., "McAfee Network Security Platform, Optimize network protection with next-generation instrusion prevention," Data Sheet, 2011, 3 pages.

McAfee, Inc., "McAfee® Network Security Platform, Version 5.1," Getting Started Guide, Revision 8.0, 2001-2010, 79 pages.

Salowey et al., "Transport Layer Security (TLS) Session Resumption with Server-Side State," RFC 5077, Jan. 2008, 20 pages.

Blake-Wilson et al., "Transport Layer Security (TLS) Extensions," RFC 4366, Apr. 2006, 31 pages.

Networks Associates Technology, Inc "McAfee IntruShield Network IPS Sensor," Data Sheet, 2004, 8 pages.

* cited by examiner

TECHNIQUES FOR AUTHENTICATED POSTURE REPORTING AND ASSOCIATED ENFORCEMENT OF NETWORK ACCESS

This application is a continuation of, and claims priority to, U.S. patent application Ser. No. 11/174,205, filed on Jun. 30, 2005.

TECHNICAL FIELD

Embodiments of the invention relate to networked electronic devices. More particularly, embodiments of the invention relate to techniques for enforcement of network access policies.

BACKGROUND

As threats from malware (e.g., computer viruses, Trojan horses, worms) continue to grow, network security continues to be a challenge to network administrators. Current detection techniques are generally reactive and are designed to react to known malware that has been spread. That is, when new malware is discovered, identifying characteristics are used to identify future instances of the malware. Applying this detection technique to a network may allow spread of malware under some conditions.

Current network access control architectures are typically limited to static role designations that usually correspond to a particular class of device (e.g. access requestor, Policy Enforcement Point, access server, Policy Decision Point). Furthermore, the definition of the network boundary is implicitly defined by the topology of devices acting as Policy Enforcement Points.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are architectures and techniques that allow a firmware agent to operate as a tamper-resistant agent on a host platform that may be used as a trusted policy enforcement point (PEP) on the host platform to enforce policies even when the host operating system is compromised. In one embodiment, this PEP may be used to open access control and/or remediation channels on the host platform. The firmware agent may also act as a local policy decision point (PDP) on the host platform by providing policies if a host trust agent is non-responsive and may function as a passive agent when the host trust agent is functional.

Figure 1:
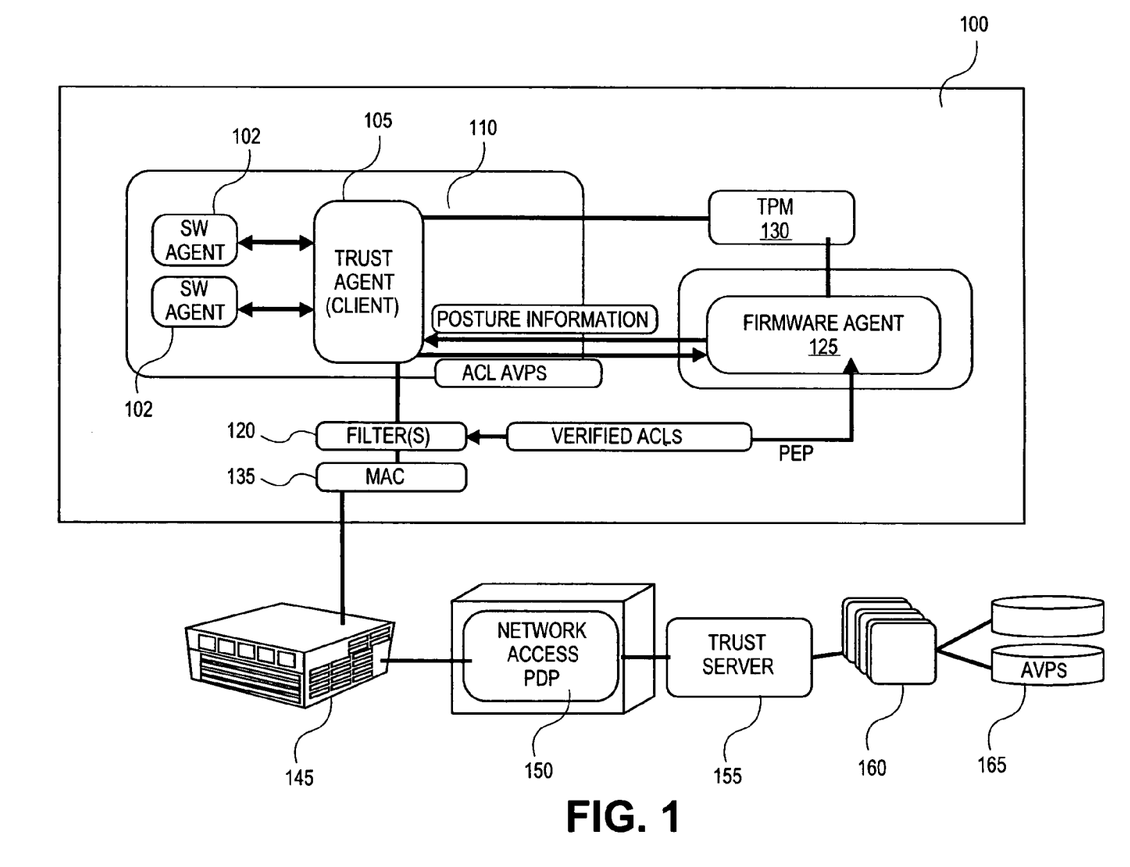
FIG. 1 is a high-level block diagram of a host platform coupled with network components.

FIG. 1 is a high-level block diagram of a host platform coupled with network components. The host platform device of FIG. 1 is intended to represent a broad range of electronic devices that may be coupled with a network. Additional components (not illustrated in FIG. 1) may be included in various embodiments of the host platform device.

A service processor, labeled firmware agent 125 in the FIG. 1, may be used for tamper resistant posture reporting and remediation of host platform 100. In one embodiment, firmware agent 125 has two properties: 1) no code executing within host operating system 110 can tamper with firmware agent code, prevent firmware agent code from running, or circumvent operation of the firmware agent; and 2) firmware agent 125 has exclusive access to host resources including, for example, traffic filters 120 on a network interface card and unrestricted access to other resources including, for example, a disk controller and host physical random access memory.

With these properties, firmware agent 125 (or service processor) or hardware enforced partition containing one or more control circuits on host platform 100 may serve as a tamper-resistant execution environment on host platform 100. Firmware agent 125 may host code that attests to the integrity of the software on host platform 100. Such integrity attestations may be quantified in terms of assertions that can be made about the code and components running on host platform 100, that they are the correct image, uncompromised, and have not been circumvented.

These assertions may be used to determine the security posture of host platform 100. Described herein are architectures and techniques that use firmware agent 125 to report the security posture of host platform 100 and possibly limit access to a network given the security posture of host platform 100. This may allow platform 100 to function as a policy enforcement point (PEP) acting on behalf of a network administrator so a vulnerable or possibly compromised platform may have restricted access to the network. Additionally, firmware agent 125 may have a dedicated network stack for out-of-band remote manageability of platform 100 if host operating system 110 malfunctions or is compromised by an attack. Such remote management may be used to remotely fix host platform 100 when the security posture of host platform 100 is determined to be vulnerable or compromised.

In a Network Access Control (NAC) exchange, client trust agent 105 may execute on host platform 100 as an access requestor (AR). Trust agent 105 may initiate a (e.g., layer 2) network connection to Network Access Server (NAS) 145 thereby communicating the intent to connect to the network. NAS 145 can further offload the decision process to network access policy decision point (PDP) 150. Firmware agent 125 may prevent any other traffic from entering or exiting host platform 100 other than the network access control channel, via leveraging traffic filtering capabilities (e.g., filter(s) 120) on host platform 100 or network interface card (NIC).

This provides a first level of protection to host platform 100 (and to the network). The control channel connection may be routed to network access PDP 150, which may be equipped to make network access control decisions. Responses from network access PDP 150 either allow or prevent access based, at least in part, on evaluation of credentials and posture information conveyed from host platform 100. Posture information may be collected by software agents 102 and/or by firmware agent 125.

In one embodiment, a secure enrollment procedure may be performed to cryptographically bind the identities of host platform 100 with firmware agent 125. In one embodiment, host platform 100 and firmware agent 125 identities may be represented as cryptographic identities and those identities may be further protected using Trusted Platform Module (TPM) 130. In the example of FIG. 1 TPM 130 may conform to the TPM Specifications, version 1.2, published Oct. 2, 2003, available from the Trusted Computing Group of Portland, Oreg. as well as related and subsequent specifications and/or standards.

Binding may allow firmware agent 125 to report the posture information for each specific host environment (consisting of one or more hardware-software combinations). In one embodiment, each host environment may have network access control reporting mechanisms and associated posture credentials. The reporting capabilities of host platform 100 and firmware agent 125 may be used to exchange posture information with network access PDP 150.

In one embodiment, a mechanism for providing host platform 100 to firmware agent 125 bindings may include: 1) establishing unique identities for host platform 100 and for firmware agent 125, for example, using Public-Key/Private-Key Identity Certificates, for host platform 100 and for firmware agent 125 and may support use of a multi-owner TPM 150; and 2) creation of an attribute certificate that may include components from both host platform and firmware agent certificates including, for example, serial numbers, identifying strings, and subjects that may be signed both by the host(s) and by the firmware agent, or, with firmware agent signing on the identity of the host(s). At this point, there may be an established authenticated binding between the host environment(s) and firmware agent 125.

To provide enhanced security, the firmware agent and host environments may be mutually distrustful and may require additional protections to disambiguate interaction with the host/firmware agent endpoints. An alternate enrollment may include provisioning of symmetric keys by firmware agent 125 and at network access PDP 150. These symmetric keys may be used to generate additional key material for providing confidentiality and authentication data transfer between firmware agent 125 and network access PDP 150.

Firmware agent 125 may configure traffic filters (HW or SW) 120 via, for example, an exclusive internal bus to allow only the control channel data flow for the network access messages originating from host environments. In one embodiment firmware agent 125 may retain primary control over filters 120. In one embodiment, by default filters 120 block all access by host system 100, but firmware agent 125 may enable only network access control exchanges as one of the first actions performed after booting (e.g., in a layer 2 solution, this restriction may, for example, allow only EAPOL, management, and control messages to flow through the filters). This initial configuration may be set, for example, by network administration policy when host platform 100 is configured for enterprise usage.

In one embodiment, host platform 100 may supply multiple signed default policies to firmware agent 125 in order to allow more flexible access control policies for initial network authentication. These policies may be signed, and optionally encrypted for confidentiality, by the network administrative domain. This signature, and optionally encryption, may be verified by firmware agent 125. In one embodiment, firmware agent 125 may only accept default policies that have been appropriately signed and can be verified.

Such default policies may supply any number of filter configurations (e.g. L2 Extensible Authentication Protocol Over LAN (EAPOL), L3 Virtual Private Network (VPN), L4 VPN, Transport Layer Security (TLS) web server, Remote Authentication Dial-In User Service (RADIUS) server, Internet Service Provider (ISP) server) that may enable posture assessment via any number of roaming scenarios from any number of networks. Default filters may be designated for expiration after a period of time so that they can be securely refreshed by a PDP on subsequent NAC connection attempts.

In one embodiment, host trust agent 105 may establish a secure (authenticated and optionally, confidentiality protected) intra-platform channel to firmware agent 125 to gather integrity measurements made by software agents 102 pertaining to, for example, host resident applications, platform hardware. Firmware agent 125 may report collected posture information by leveraging TPM 130 and other local reporting capabilities. Also, host platform 110 may employ techniques for measuring firmware agent 125 and report these metrics as part of the host integrity report. Host platform 110 may use the authenticated channel to determine whether attribute-value pair (AVP) requests/responses have been communicated with the desired host(s).

The posture measurements may be sent as AVPs or type-length values (TLVs) that are signed with a private/symmetric key of firmware agent 125, and optionally, encrypted for confidentiality protection, using symmetric keys provisioned in the binding step. This may ensure that the data submitted by firmware agent 125 is no modified enroute and provides assurance to a PDP component that the data is submitted by an entity possessing the pertinent keying material. In one embodiment, an unpredictable nonce ($Nonce_{Firmware}$) is included in the data to be signed to prove liveliness of the PDP, and ensure that an intermediary rogue trust agent cannot capture and replay the measurements. A nonce for the PDP ($Nonce_{PDP}$) may also be included in the calculation of this digital signature.

In one embodiment, the signature may be performed on a final hash value of data to be signed. Trust agent 105 may also collect other posture information from operating system 110 and software agents 102. Note that if a rogue trust agent modifies or does not send firmware agent 125 integrity measurements, this action can be detected at the server (based, at least in part, on associated security credentials), and appropriate remedial action can be taken. Because of the security association between network access PDP 150 and firmware agent 125, no checks of trust agent 105 may be needed. However, firmware agent 125 may provide some integrity measurements of trust agent 105 to further strengthen the exchange.

In one embodiment, host trust agent 105 may initiate a network access request that may establish a secure data channel for further communications between trust agent 105 and network access PDP 150, by employing any number of standards or proprietary protocols for authentication of each side. Note that network element 145 typically allows control channels data to flow and reach a PDP. Network access PDP 150 may send an unpredictable (random) nonce session identifier ($Nonce_{PDP}$), to establish proof-of-liveness for firmware agent 125.

Firmware agent 125 may include the $Nonce_{PDP}$ in a digital signature AVP sent from firmware agent 125 to network access PDP 150. In one embodiment, the nonces are at least 32 octets. Optionally, this element can be confidentiality protected using symmetric keys provisioned in the binding described above. Other nonce sizes and/or security protocols may also be supported.

In one embodiment, AVPs collected by trust agent client 105 may be exchanged over the authenticated channel. Posture information sent by firmware agent 125 to network access PDP 150 may be evaluated trust server 155, first for integrity and authenticity of the data, using digital signature verification, and optionally, decrypting the message if confidentiality was protected using encryption. Trust server 155 may compare the posture AVPs with administrative policies 160, which may include AVPs 165 to determine whether to allow host platform 100 connect to additional network resources.

In one embodiment, network access PDP 150 may use the secure channel to return signed, and optionally encrypted, result, to firmware agent 125. This signed result may be calculated over one of more of the following: AVPs to software agents 102 and to firmware agent 125 on the host platform 100, and $Nonce_{Firmware}$. Firmware agent 125 may verify the integrity and authenticity of the AVPs and interpret the AVPs. Firmware agent 125 may also check that the $Nonce_{Firmware}$ is the same as the $Nonce_{Firmware}$ that was sent previously. These AVPs can provide firmware agent 125 with functionality parameters including, for example, access control lists, filters, to be installed by firmware agent 125 and/or instructions on how to fix or remediate host platform 100.

In one embodiment, if access to the network is denied, the return AVPs may contain instructions for remediation. Network access PDP 150 may return access control lists to set filters 120. These filters may allow fine granular access control to the network. Alternatively, network access PDP 150 may return a Universal Resource Locator (URL) that host platform 100 may use to download patches from specified servers. Firmware agent 125 may use an out of band network connection to download and verify patches.

Also, the connection to the network may pass, in which case network access PDP 150 can return Layer 3 or Layer 4 traffic rules to host platform 100, which may be applied with a high degree of assurance via firmware agent 125. Note that failsafe rules or default network policies can be enforced by firmware agent 125 if no results are received or if some malware launches a denial of service attack on the network access control communication. In either case, an attack can be detected and network administrators may be informed via the out of band access. Other rules could include application specific rules used within an application aware firewall, virus signatures, email scanners, and other application level services which can be implemented within a firmware agent partition or other protected software.

In one embodiment, if platform 100 is limited in the number of filters that can be installed (e.g. via hardware), it is possible that returned access control lists can be supplied in parts, so the host can choose which filters should be configured at any point in time. This way, a large number of applications may be granted network access by network access PDP 150, but host platform 100 may only provide firmware agent 125 with those signed filters that are needed for the currently active applications.

In one embodiment, individual filter AVPs can be designated by network access PDP 150 or firmware agent 125 to expire after a specified period of time (e.g., absolute time, or time since last PDP exchange) to remove the possibility of their reuse outside of the time period, allowing old filters be automatically removed on subsequent PDP exchanges. In this way, limited resources, such as hardware filters, can be better utilized by the system as a whole.

The architectures and techniques described herein may provide one or more of the following advantages. If the host platform supports a reduced set of hardware resources (e.g., filters), the network access PDP may transmit multiple signed access control list (ACL) segments to the host platform in response to attribute-value pairs (AVPs), and the firmware agent may selectively use the limited hardware resources.

Resources controlled by the firmware agent may be situated, for example, in a service partition, or can be integrity checked.

The network access PDP may provide multiple signed filter sets to the host platform and the firmware agent may apply one or more of the multiple filter sets under different connectivity scenarios. This may allow the host platform to apply consistent policies irrespective of connectivity. The architecture described herein is generally secure because various forms of attack, such as denial of service (DOS), rogue trust agent, or circumvention, may be detected by the firmware agent, and failsafe actions can be taken.

In one embodiment, if operating system 110 is compromised or non-responsive, firmware agent 125 may perform the role of an access requestor on the network so that firmware agent 125 may open an out of band (OOB) channel for remediation. Firmware agent 125 may also engage in authentication challenge-response exchanges that establish the capabilities and trust with network access PDP 150. Host operating system 110 may not have network access in this situation.

The architecture and techniques described herein may leverage access media and/or protocols available to the host platform including, for example, virtual private network (VPN) tunnels and roaming scenarios, where only the host stack may have the capabilities to access a home network. This may enable posture assessment via any number of roaming scenarios from any number of networks. The architecture and techniques described herein may also reduce flash memory requirements for the firmware agent by not requiring implementation of a large variety of network access control or authentication protocols.

The architectures and techniques described herein may also allow firmware agent 125 to detect circumvention of the physical network interfaces under control of firmware agent 125, for example, by a user plugging in a Universal Serial Bus (USB) based network interface, over which firmware agent 125 may have no control, and then report this violation to network access PDP 150 so the host system may be provided restricted network access. The architectures and techniques described herein may allow firmware agent 125 and network access PDP 150 to mutually authenticate each other, and establish cryptographic "proof-of-liveness" in both directions. This may defeat replay and delayed messages attacks on the host platform.

Figure 2:
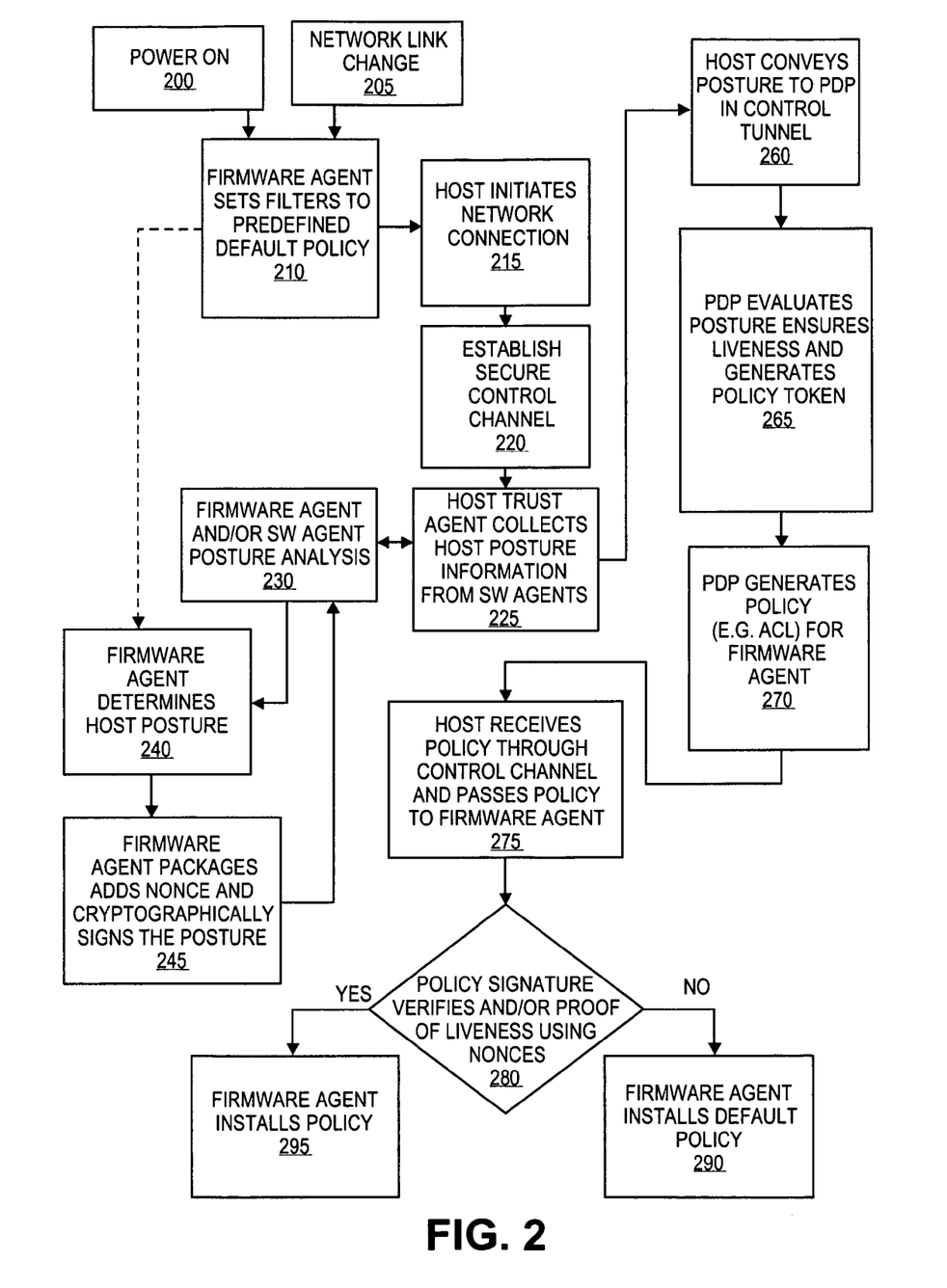
FIG. 2 is a flow diagram of one embodiment of a technique for network access granted based on platform posture.

FIG. 2 is a flow diagram of one embodiment of a technique for network access granted based on platform posture. In response to a power on event, 200, or a network link change event, 205, a firmware agent may set network filters to a predefined default policy, 210. The default policy may be, for example, to allow the host platform to access only specified network resources until an acceptable security policy can be verified.

The firmware agent may measure the host security posture, 240, by detecting and/or measuring specified host platform parameters. The firmware agent may also determine the host security posture by communicating with a trust agent and/or software agents on the host platform that detect and/or measure specified host platform parameters. In one embodiment, the firmware agent may us a nonce and/or cryptographically sign the resulting security posture data, 245.

In one embodiment, the host platform may initiate a network connection, 215. In response to the initiation, the firmware agent and/or a network interface may establish a secure control channel, 220, between the host platform and a network access policy decision point or other network entity. The host trust agent may collect host posture information from software agents, 225.

The host platform may communicate the posture information to the network access PDP (or other network entity) using the secure control channel, 260. In one embodiment the host platform may communicate with the PDP through the firmware agent as described above. The PDP may evaluate the posture information, 265. The evaluation by the PDP may include validity and proof of liveness. The evaluation also includes a security evaluation of the host platform based on the security posture information received from the host platform.

The PDP may generate, or otherwise provide, a policy to the host platform based on the posture information, 270. In one embodiment, the policy provided by the PDP may include one or more access control lists that the firmware agent may use to control network access by the host platform.

In one embodiment, the PDP may indicate under what conditions the filter rules may be applied. For example, if the host is connecting via LAN vs. WLAN different filter files may be applied where there is a differential in granted access. When location information is available such as connection through a particular portal or physical location, the host may supply a filter rule appropriate for the location as indicated by the PDP and verified by the firmware agent.

The host platform may receive a policy through a control channel that is passed to the firmware agent, 275. In one embodiment, the firmware agent verifies the policy signature and/or proof of liveness using the nonces, 280. If the verification is successful the firmware agent may install the policy, 295. In one embodiment, installation of the policy may include the firmware agent updating network filters based on an access control list received from the network PDP. In one embodiment, if verification is not successful, the firmware agent may install a default ACL or take other default remediation steps.

Figure 3:
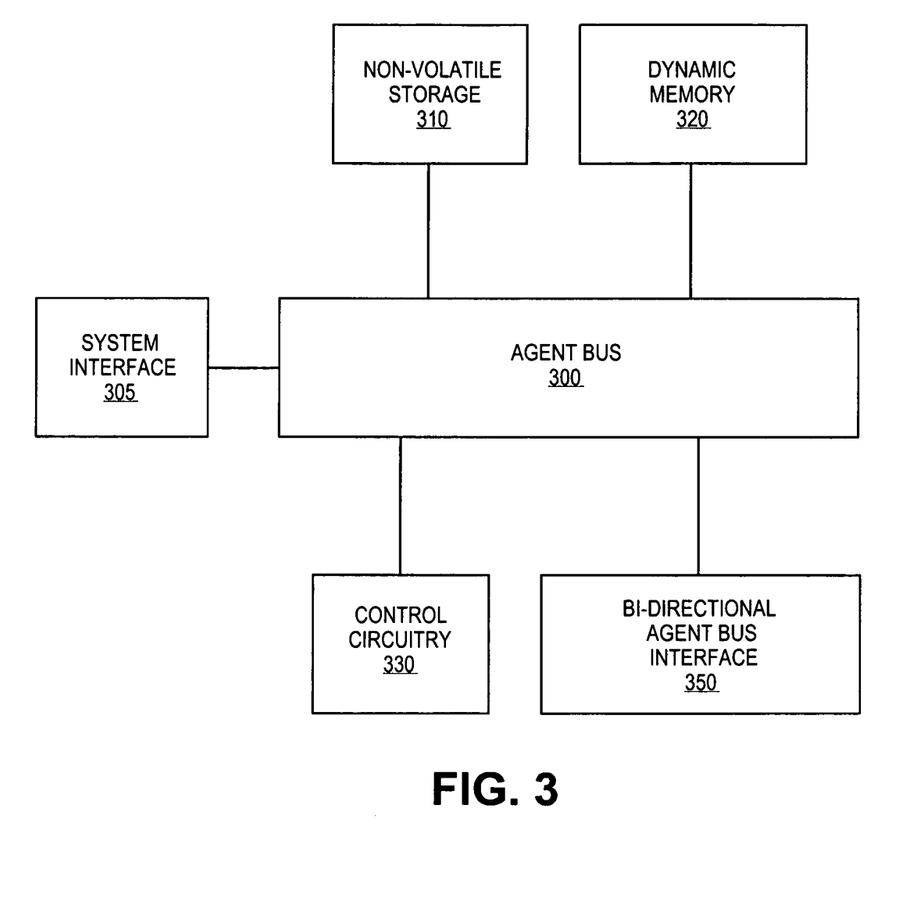
FIG. 3 is a block diagram of one embodiment of an embedded firmware agent.

FIG. 3 is a block diagram of one embodiment of an embedded firmware agent. In the example of FIG. 3 the embedded firmware agent may be an Extensible Firmware Interface (EFI) as defined by the EFI Specifications, version 1.10, published Nov. 26, 2003, available from Intel Corporation of Santa Clara, Calif. In alternate embodiments, other firmware components can also be used.

In one embodiment, the embedded firmware agent may include agent bus 300 coupled with system interface 305. System interface 305 may provide an interface through which the embedded firmware agent may communicate with the host system in the manner described above. The embedded firmware agent may further include bi-directional agent bus interface 350 that may be coupled with bus 300 to allow the embedded firmware agent to communicate with other system components.

In one embodiment, the embedded firmware agent may further include dynamic memory 310 that may be coupled with agent bus 300. Dynamic memory 310 may provide storage for instructions and/or data to be used during operation. The embedded firmware agent may further include non-volatile storage 320 that may be coupled with agent bus 300 to store static data and/or instructions. In one embodiment, the embedded firmware agent may include control circuitry 330 coupled with agent bus 300 that may perform control operations and/or execute instructions provided by dynamic memory 310 and/or non-volatile storage 320. Thus, the firmware agent may include sufficient functionality to perform operations independent of the host platform and/or host operating system.

Figure 4:
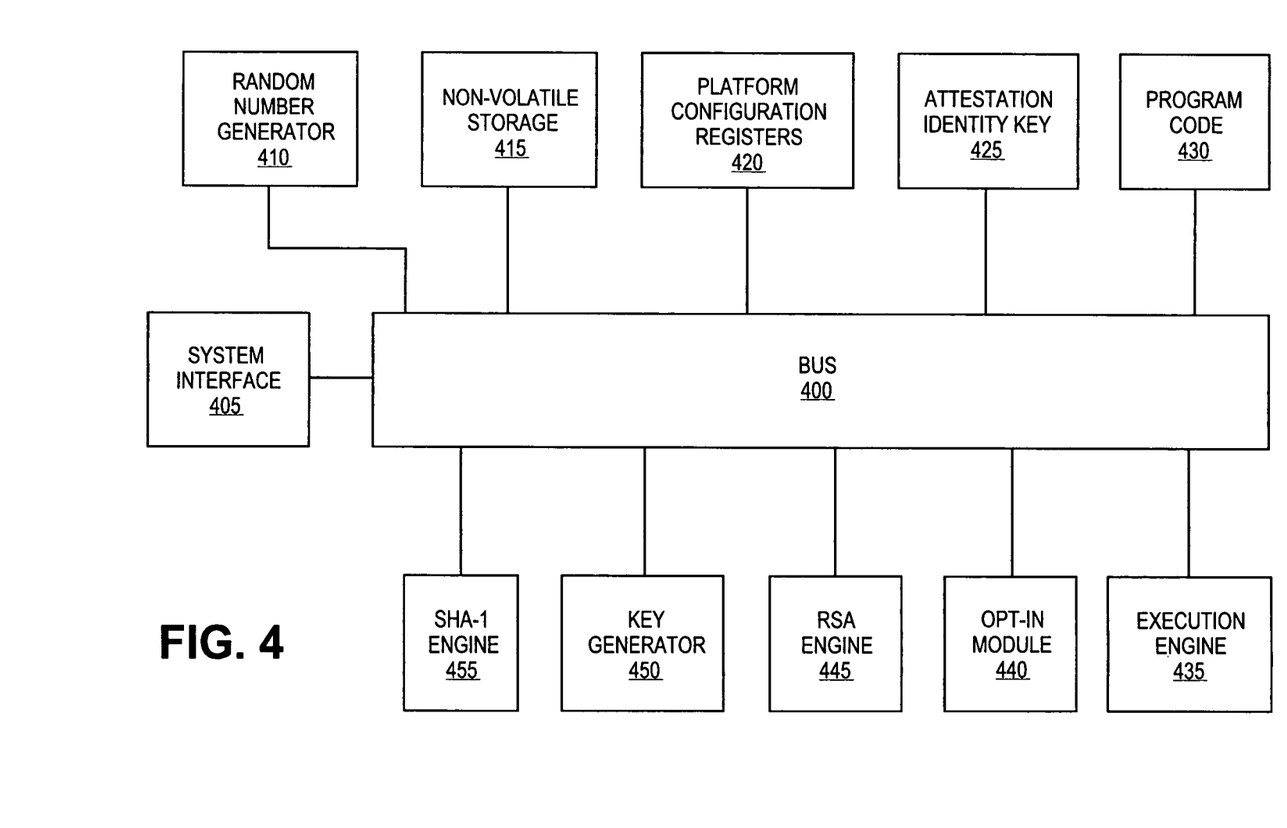
FIG. 4 is a block diagram of one embodiment of a trusted module.

FIG. 4 is a block diagram of one embodiment of a trusted module. In the example of FIG. 4 the trusted module may be a Trusted Platform Module (TPM) as defined by the TPM Specifications, version 1.2, published Oct. 2, 2003, available from the Trusted Computing Group of Portland, Oreg. In alternate embodiments, other implementations of the trusted module, for example, a secure storage device, can be used to provide support for security operations.

In one embodiment, the trusted module may include bus 400 coupled with system interface 405. System interface may provide an interface through which the trusted module communicates with the host system. The trusted module may include random number generator 410 coupled with bus 400 to generate random numbers for cryptographic operations and non-volatile storage 415 coupled with bus 400 to store data and/or instructions for use in operation of the trusted module.

The trusted module may further include platform configuration registers 420, which may be used to store protected information related to the integrity of the host system. In one embodiment, the trusted module also includes a storage component coupled with bus 400 to store attestation identity key (AIK) 425. In one embodiment, AIK 425 may be a 2048-bit RSA key that can be used to digitally sign information and cryptographic keys generated by the trusted platform module and/or the host system. Other AIK configurations can also be used.

Program code 430 may be stored in memory, either volatile or non-volatile, coupled with bus 400. Program code 430 includes instructions that cause the trusted module to operate to provide security operations. In one embodiment, execution engine 435 is coupled with bus 400 to execute program code 430. The trusted module may further include opt-in module 440 that allows a user of the host system to enable or disable operation of the trusted module. Opt-in module 440 can be, for example, a physical switch on the host system.

In one embodiment, the trusted module may include RSA engine 445 coupled with bus 400 that performs RSA security operations. The trusted module may further include key generator 450 coupled with bus 400 that may generate one or more keys for cryptographic operations. SHA-1 engine 455 may also be coupled with bus 400 and may perform Secure Hash Algorithm operations for use in security functionality provided by the trusted module.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving posture information, at a remote device via a network interface, for an endpoint;
   determining network access policies for the endpoint based on the posture information, the network access policies comprising at least one access control list that is cryptographically bound to a pre-selected configuration of the endpoint and/or a firmware agent resident on the endpoint; and
   enforcing the network access policies.

2. The method of claim 1, wherein enforcing the network access policies comprises applying network access limitations from the remote device by components of the endpoint.

3. The method of claim 1, wherein enforcing the network access policies comprises applying a default access control limitation if no access control limitations have been sent to the endpoint from the remote device.

4. The method of claim 3, wherein if a network access control list provided by the endpoint satisfies constraints specified by the remote device, the method further comprising selectively applying the network access control list provided by the endpoint.

5. The method of claim 1, wherein the remote device comprises a network access policy decision point (PDP).

6. The method of claim 1, wherein at least one of the one or more access control lists from the remote device include usage constraints related to one or more of: location of the endpoint, type of connection, time of day, firmware agent mode, endpoint electronic device mode.

7. The method of claim 1, wherein a secure connection is established between the remote device and a trusted firmware agent resident on the endpoint via the network interface, wherein the endpoint includes an untrustworthy component.

8. The method of claim 7, wherein the untrustworthy component comprises a hardware platform running an untrusted operating system.

9. The method of claim 7, wherein the secured connection established between the remote device and the trusted firmware agent comprises cryptographically binding the remote device and the firmware agent.

10. The method of claim 7, further comprising cryptographically binding the firmware agent with a trusted platform module resident on the endpoint through, at least in part, generation, storage and certification of cryptographic keys used in cryptographic binding of the firmware agent to the remote device.

11. An article comprising a computer-readable storage device having stored thereon instructions that, when executed, cause one or more processors to:
receive posture information, at a remote device via a network interface, for an endpoint;
determine network access policies for the endpoint based on the posture information wherein at least one of the network access policies is cryptographically bound to a pre-selected configuration of the endpoint and/or a firmware agent resident on the endpoint; and
enforce the network access policies.

12. The article of claim 11, wherein to enforce the network access policies comprises to apply network access limitations from the remote device by components of the endpoint.

13. The article of claim 11, wherein to enforce the network access policies comprises to apply a default access control limitation if no access control limitations have been sent to the endpoint from the remote device.

14. The article of claim 13, wherein if a network access control list provided by the endpoint satisfies constraints specified by the remote device, the article further comprising instructions to selectively apply the network access control list provided by the endpoint.

15. The article of claim 11, wherein the remote device comprises a network access policy decision point (PDP).

16. The article of claim 11, wherein the network access policies comprise one or more access control lists (ACLs) received from the remote device.

17. The article of claim 16, wherein at least one of the one or more access control lists from the remote device includes usage constraints related to one or more of location of the endpoint, type of connection, time of day, firmware agent mode, endpoint electronic device mode.

18. The article of claim 17, wherein the at least one access control list is cryptographically bound to a pre-selected configuration of the endpoint and/or a firmware agent resident on the endpoint.

19. The article of claim 11, wherein a secure connection is established between the remote device and a trusted firmware agent resident on the endpoint via the network interface, wherein the endpoint includes an untrustworthy component.

20. The article of claim 19, wherein the untrustworthy component comprises a hardware platform running an untrusted operating system.

21. The article of claim 19, wherein the secured connection established between the remote device and the trusted firmware agent comprises cryptographically binding the remote device and the firmware agent.

22. The article of claim 19, further comprising instructions to cryptographically bind the firmware agent with a trusted platform module resident on the endpoint through, at least in part, generation, storage and certification of cryptographic keys used in cryptographic binding of the firmware agent to the remote device.

23. An apparatus comprising:
an endpoint coupled to a network interface to support one or more software agents and configured to establish a first host environment and a second host environment;
a firmware agent coupled to the endpoint and the network interface and separately cryptographically bound to the first host environment and the second host environment to gather posture information from one or more security agents, to transmit a report including the posture information to a remote device via the network interface, and to configure the network interface according to network access control information received from the remote device via the network interface.

24. The apparatus of claim 23 wherein at least one of the security agents comprises a hardware agent coupled with the endpoint.

25. The apparatus of claim 23 wherein the remote device comprises a network access policy decision point (PDP).

26. The apparatus of claim 23 wherein the network access control information comprises one or more access control lists (ACLs) received from the remote device.

27. The apparatus of claim 26 wherein at least one of the one or more access control lists from the remote device include usage constraints related to one or more of: location of the endpoint, type of connection, time of day, firmware agent mode, endpoint device mode.

28. The apparatus of claim 27 wherein the at least one access control list is cryptographically bound to a pre-selected configuration of the firmware agent.

* * * * *